(12) United States Patent  (10) Patent No.: US 7,765,476 B2
Maine  (45) Date of Patent: Jul. 27, 2010

(54) FLEXIBLE WORKFLOW TOOL INCLUDING MULTI-LINGUAL SUPPORT

(75) Inventor: Dale W. Maine, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 973 days.

(21) Appl. No.: 11/511,132

(22) Filed: Aug. 28, 2006

(65) Prior Publication Data

US 2008/0052613 A1  Feb. 28, 2008

(51) Int. Cl.
G06F 17/00 (2006.01)
(52) U.S. Cl. .................................. 715/265; 715/222
(58) Field of Classification Search ................ 715/222, 715/221, 223, 229, 264, 265, 703, 234, 235, 715/236, 237, 239
See application file for complete search history.

(56) References Cited

U.S. PATENT DOCUMENTS

| | | | | |
|---|---|---|---|---|
| 5,678,039 A * | 10/1997 | Hinks et al. | ...................... | 707/4 |
| 5,890,130 A * | 3/1999 | Cox et al. | ........................ | 705/7 |
| 5,987,402 A * | 11/1999 | Murata et al. | ................... | 704/2 |
| 6,006,193 A * | 12/1999 | Gibson et al. | ................... | 705/8 |
| 6,623,529 B1 * | 9/2003 | Lakritz | ........................ | 715/205 |
| 6,665,587 B2 | 12/2003 | Leone | | |
| 6,816,762 B2 | 11/2004 | Hensey | | |
| 6,840,422 B2 | 1/2005 | Mintzer | | |
| 6,845,507 B2 | 1/2005 | Kenton | | |
| 6,862,488 B2 | 3/2005 | Mansour-Awad | | |
| 6,862,573 B2 | 3/2005 | Kendall | | |
| 7,207,005 B2 * | 4/2007 | Lakritz | ........................ | 715/201 |
| 7,627,592 B2 * | 12/2009 | Crockett et al. | ..................... | 1/1 |
| 2002/0016729 A1 * | 2/2002 | Breitenbach et al. | ........... | 705/9 |
| 2002/0111963 A1 * | 8/2002 | Gebert et al. | ............... | 707/513 |
| 2006/0069981 A1 * | 3/2006 | Enenkiel | ...................... | 715/500 |
| 2006/0156278 A1 * | 7/2006 | Reager | ......................... | 717/104 |
| 2006/0200766 A1 * | 9/2006 | Lakritz | ........................ | 715/536 |
| 2006/0206346 A1 * | 9/2006 | Grand et al. | .................... | 705/1 |
| 2006/0216683 A1 * | 9/2006 | Goradia | ...................... | 434/322 |
| 2006/0225032 A1 * | 10/2006 | Klerk et al. | .................. | 717/105 |
| 2007/0106541 A1 * | 5/2007 | Raisanen | ........................ | 705/7 |
| 2007/0203876 A1 * | 8/2007 | Hoopes et al. | .................. | 707/1 |
| 2007/0245300 A1 * | 10/2007 | Chan et al. | .................... | 717/105 |
| 2008/0040499 A1 * | 2/2008 | English | ........................ | 709/231 |
| 2008/0046231 A1 * | 2/2008 | Laden et al. | .................... | 704/8 |
| 2009/0287532 A1 * | 11/2009 | Cohen et al. | .................... | 705/9 |

* cited by examiner

*Primary Examiner*—Laurie Ries
(74) *Attorney, Agent, or Firm*—Carlson, Gaskey & Olds, P.C.

(57) ABSTRACT

A method of generating a flexible automated workflow system includes identifying a workflow process, creating at least one form associated with the workflow process identified for display in a base language, generating a user interface version of the at least one form, and displaying the user interface version of the at least one form in the base language for use by a user. A user selectable option to translate includes providing at least one alternate translation of the user interface version of the at least one form into at least one alternate language when the at least one alternate translation was provided by a developer when the at least one form was created and an option to translate is selected by the user. Alternatively, the at least one translation of the user interface version of the at least one form can also be displayed when the at least one alternate translation is provided by a developer subsequent to creation of the at least one form.

17 Claims, 4 Drawing Sheets

Fig-2

```
                                                            Sample
  MyWorkflow                                           Sample Form
  Administration                           Development Version 1 [XML]
```

- 22 — Field Name: UserEntry
  (Single Word, No Spaces or Punctuation) — 28
- 24 — Label Text: Enter Sample Data:
  (How field will be labeled on input/display forms)
- 26 — Field Type: Data Entry
- 30 — Format/Content: Any Text
- 32 — Maximum Input Length:
- 34 — Default Value (if any):
- 36 — Help/Formatting Text:
- 38 — Comments/Documentation:

40 — Save Field Definition | Save And Add Another — 42 | Cancel Changes — 44

Fig-3

- 22 — Field Name: Color
  (Single Word, No Spaces or Punctuation) — 28
- 24 — Label Text: Select Color:
  (How field will be labeled on input/display forms)
- 26 — Field Type: Selection List (itemized)
- 52 — List of Selection Options: Red, Yellow, Blue
  (Comma Separated List of Values)

┌─100
                                           Translation To: Español (Spanish)
         104    102                        Translation Table Status: [Active ▼]

[Area] [Item] [Attribute]                    From/To
        Workflow       Title      Sample Form ──── 106
                                  ┌────────────────────────────────┐
                                  │ Pruebe Forma                   │──108
                                  └────────────────────────────────┘
        Field  UserEntry fieldLabel Enter Sample Data: ──── 106
                                  ┌────────────────────────────────┐
                                  │ Entre los Datos de la Muestra: │──108
                                  └────────────────────────────────┘
        Field  Color    fieldLabel Select Color: ──── 106
                                  ┌────────────────────────────────┐
                                  │ Escoja el color:               │──108
                                  └────────────────────────────────┘
        Field  Color    selectionList Red,Yellow,Blue ──── 106
                                  ┌────────────────────────────────┐
                                  │ Rojo,Amarillo,Azul             │──108
                                  └────────────────────────────────┘
        Field  ITarea   fieldLabel I/T Area: ──── 106
                                  ┌────────────────────────────────┐
                                  │ Area I/T:                      │──108
                                  └────────────────────────────────┘
        Field  ITarea   query     select initiative_name from cta_initiatives Order By initiative_name
                                  *Provide alternate query which returns exactly two values: the base language and foreign
                                  language versions of each option*
                                  ┌────────────────────────────────┐
                                  │ select initiative_name, initiatives_spanish from │
                                  │ cta_initiatives order by initiative_spanish     │
                                  │                                                 │
                                  └────────────────────────────────┘

Activity  1   dispositionOptions Submit Form ──── 106
                                  ┌────────────────────────────────┐
                                  │ Sométase Forma                 │──108
                                  └────────────────────────────────┘
                110 ──┐ [ Save Translation ]  [ Cancel Changes ]─── 112

Fig-7

┌─120
        124 ──── Sample Form                              [English ▼]
                                                          122 ─┘
          ┌─ Enter Sample Data: [ Some user data        ]
        126 ─ Select Color:     [ Yellow ▼ ]──── 130
          └─ I/T Area:          [ Infrastructure   ▼ ]

[ Submit Form ]──── 128

Fig-8A

┌─120
        124 ──── Pruebe Forma                             [Español (Spanish) ▼]
                                                          122 ─┘
        ┌─ Entre los Datos de la Muestra: [ Some user data ]
        │─ Escoja el Color: [ Amarillo ▼ ]──── 130
        └─ Area I/T: [ Infraestructura ▼ ]
        126 ─┘

[ Sométase Forma ]──── 128

Fig-8B

FLEXIBLE WORKFLOW TOOL INCLUDING MULTI-LINGUAL SUPPORT

BACKGROUND OF THE INVENTION

The present invention relates generally to a workflow automation tool, and more particularly, to a flexible workflow automation tool including individual form and process configurations, and multi-lingual support.

Known systems for workflow management include manual or paper-based workflow processes that include standard forms. These forms are filled out by one individual, and subsequently passed to several others, in sequence, for review and approval before finally being acted upon. These known paper-based workflow management systems, however, are cumbersome and time-consuming, requiring a variety of different paper-forms to be manually handled and acted upon by numerous individuals before final approval. As such, ability to trace an individual paper-form as it travels through the process is almost impossible in the traditional paper-based system. In addition, throughout the traditional paper-based process, paper-forms are regularly lost or misplaced, requiring the process to be restarted from the beginning, wasting precious time and resources.

Other known systems for workflow management include automated processes that include standard forms. These forms are filled out by one individual, and subsequently transmitted electronically to several others, in sequence, for review and approval before for finally being acted upon. These known automated processes are an improvement over the traditional paper-based processes because they eliminate the manual handling of individual forms, and provide an ability to trace an individual form as it travels through the process. However, known automated workflow processes typically include only computer generated standard forms that are not editable and are limited to processes of a fixed configuration pre-defined by the software manufacturer. In addition, these known standard forms are further limited to only one language. As such, there is a need for a workflow automation tool including flexible individual form and process configurations, and multi-lingual support.

SUMMARY OF THE INVENTION

The present invention includes a method of generating a flexible automated workflow including identifying a workflow process, creating at least one form associated with the workflow process identified for display in a base language, generating a user interface version of the at least one form, displaying the user interface version of the at least one form in the base language for use by a user and providing at least one alternate translation of the user interface version. The at least one translation of the user interface version of the at least one form is displayed when the at least one alternate translation was provided by a developer when the at least one form was created and an option to translate is selected by the user. Alternatively, the at least one translation of the user interface version of the at least one form can also be displayed when the at least one alternate translation is provided by a developer subsequent to creation of the at least one form.

In one example, creation of the at least one form includes defining at least one field of information for the at least one form, generating configuration information for each field of information defined, and storing the configuration information in a markup language, for example Extensible Markup Language. A style sheet is created in a presentation language, for example Extensible Stylesheet Language, and is associated with the at least one form. The style sheet defines rules for translating the markup language used by the developer into the user interface version displayed for use by the user.

These and other features of the present invention can be best understood from the following specification and drawings, the following of which is a brief description.

BRIEF DESCRIPTION OF THE DRAWINGS

FIG. 2 is an example configuration panel used to define a Data Entry Field according to one embodiment of the present invention;

FIG. 3 is an example configuration panel used to define an Itemized Selection List Field according to one embodiment of the present invention;

FIG. 7 is an example translation input table according to one embodiment of the present invention;

FIG. 8A is an example flexible automated workflow form including a user selectable option to translate the form into at least one alternate language displayed in English according to one embodiment of the present invention; and FIG. 8B is the example flexible automated workflow form of FIG. 8A displayed in Spanish according to one embodiment of the present invention.

DETAILED DESCRIPTION OF THE PREFERRED EMBODIMENT

Figure 1:
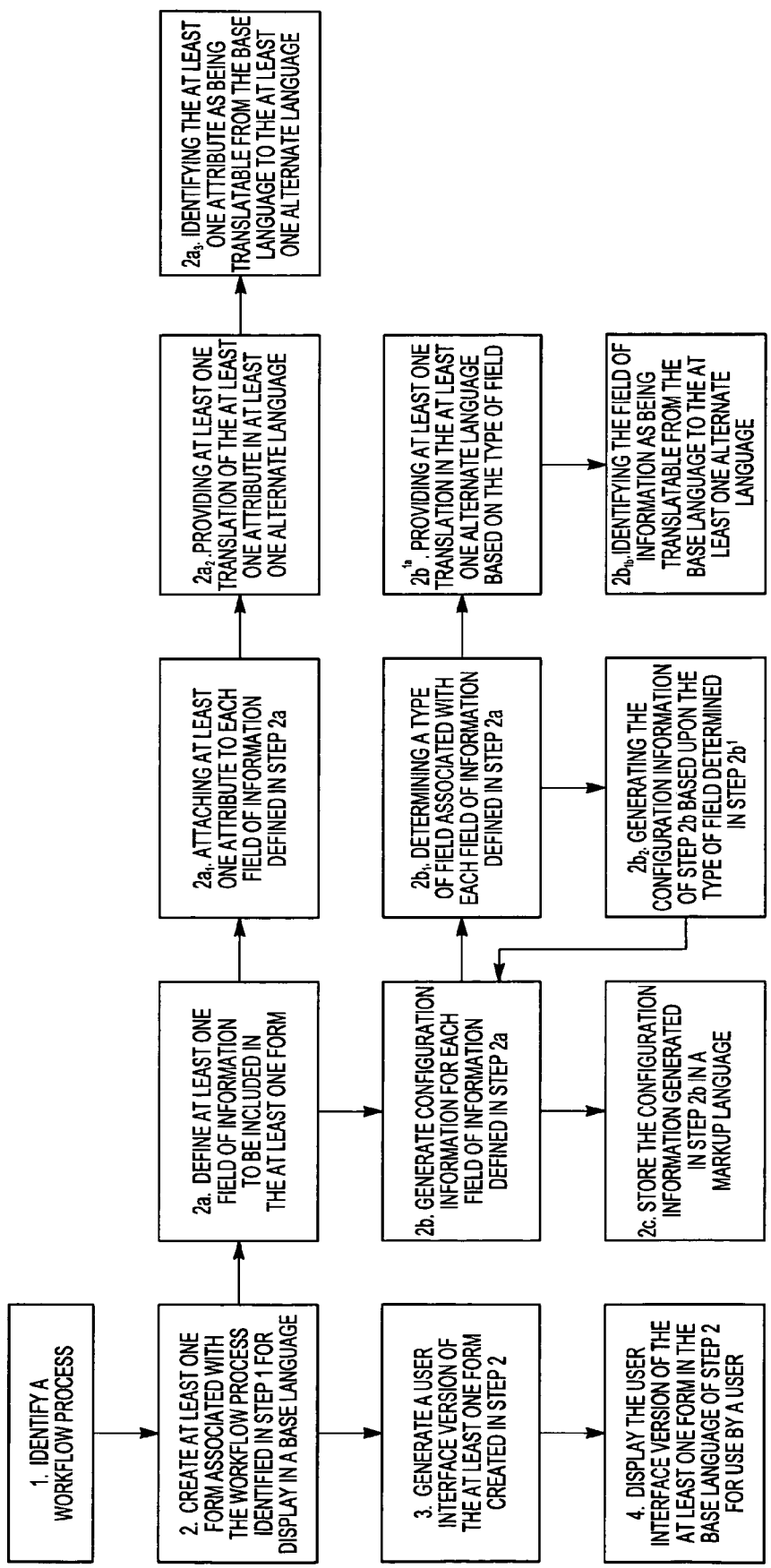
FIG. 1 is a graphical illustration of an example basic structure of a method for generating a flexible automated workflow system according to one embodiment of the present invention.

FIG. 1 is a graphical illustration of an example basic structure of a method for generating a flexible automated workflow system according to one embodiment of the present invention. The example basic structure includes: identifying a workflow process (1); creating at least one form associated with the workflow process identified in step (1) in a base language (2); generating a user interface version (3); and displaying the user interface version generated in step (3) in the base language of step (2) for use by user (4).

A developer is responsible for identifying the workflow process of step 1. Once the workflow process is identified, the developer creates at least one form associated with the identified workflow process for display in the base language as required by step 2.

The creation step 2 includes: defining at least one field of information to be included in the at least one form (2*a*); generating configuration information for each field of information defined in step 2*a* (2*b*); and storing the configuration information generated in step 2*b* in a markup language (2*c*). The at least one field of information defined in step 2*a* includes all fields of information that are necessary to complete the workflow process identified in step 1. The markup language used to store the configuration information in step 2*c* is, in this example, Extensible Markup Language. The markup language is used to store forms created by the developer under the workflow process identified in step 1.

Defining the at least one field of information as required by step 2*a* includes: attaching at least one attribute including attribute data to each field of information defined in step 2*a* via the markup language (2*a*$_1$); providing at least one translation of the at least one attribute attached to each field of information, in at least one alternate language, different from the base language (2*a*$_2$); and identifying the at least one attribute as being translatable from the base language to the at least one alternate language (2*a*$_3$). Because the at least one attribute including attribute data is attached to each of field of information defined in step 2*a* via the markup language, the at least one attribute is inserted into the user interface version when the user interface version is generated in step 3.

Generation of the configuration information of step 2*b* includes: determining a type of field associated with each field of information defined in step 2*a* (2*b*$_1$); and generating the configuration information of step 2*b* based upon the type of field determined in step 2*b*$_1$.

The type of field of step 2*b*$_1$ is an input field, which can be but is not limited to a data field, a calculated field, a queried field, or a selection list. For example, when the type of field is a queried field or a selection list, the developer provides at least one translation for the field of information in at least one alternate language, different from the base language (2*b*$_{1a}$), and identifies the fields of information as being translatable from the base language to the at least one alternate language during the creation step 2 (2*b*$_{1b}$).

To facilitate creation of the form, the developer utilizes a configuration panel to create the at least one form associated with the workflow process. The configuration panel enables the developer to define the fields of information as required in step 2*a* and generate the configuration information as required by step 2*b*. The configuration panel includes questions and options that vary with the type of field required.

An example configuration panel 20 for a Data Entry field is shown as FIG. 2. The developer enters a Field Name (22), a Label Text (24), and a Field Type (26), prompted by system comments (28). The Field Type (26) is selected from a drop down list including: Data Entry; Calculated; Queried; Selection List (Itemized); and Selection List (Queried). Depending on the type of Field Type (26) selected, the system generates additional questions and/or options requiring additional input from the developer. In the illustrated example, the type of Field Type (26) selected is: Data Entry. Based upon this selection, the system prompts the developer to enter additional information, for example, Format/Content (30), Maximum Input Length (32), Default Value (34), Help/Formatting Text (36), and Comments/Documentation (38). After the developer enters the required information, the developer has the option to Save Field Definition (40), Save And Add Another (42), or Cancel Changes (44).

An example configuration panel (50) for a Selection List (Itemized) is shown as FIG. 3. The Selection List (Itemized) includes a fixed set of options. When the type of Field Type (26) selected is a Selection List (Itemized), the system prompts the developer to enter, for example, a List of Selection Options (52).

Figure 4:
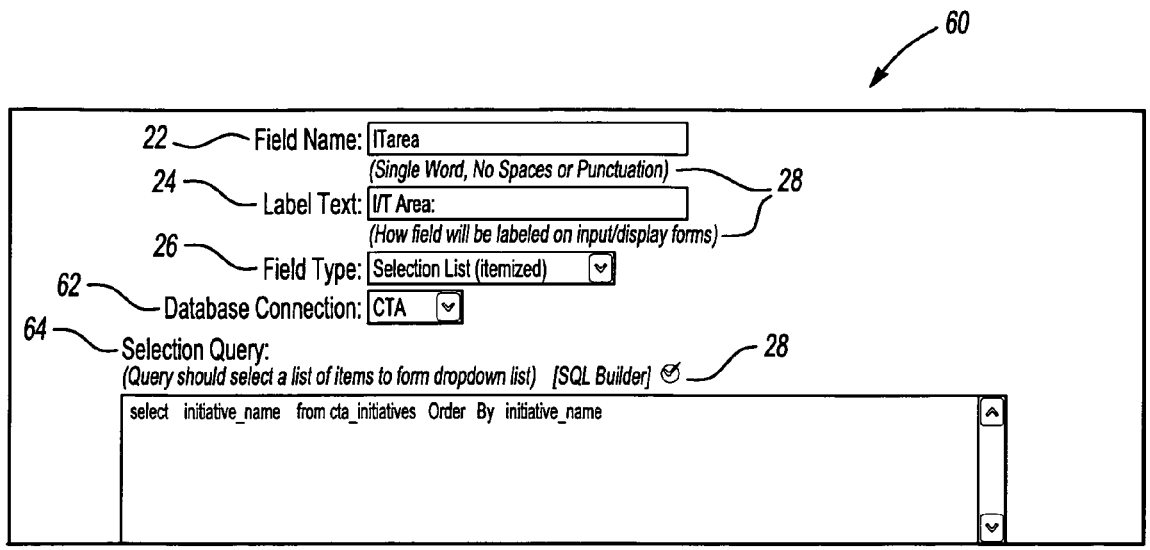
FIG. 4 is an example configuration panel used to define a Queried Selection Field according to one embodiment of the present invention.

An example configuration panel (60) for a Selection List (Queried) is shown as FIG. 4. The Selection List (Queried) includes a dynamic set of options that is queried from a database stored in the system. In this example, when the type of Field Type (26) selected is Selection List (Queried), the system prompts the developer to select a Database Connection (62) and enter a Selection Query (64).

Figure 5:
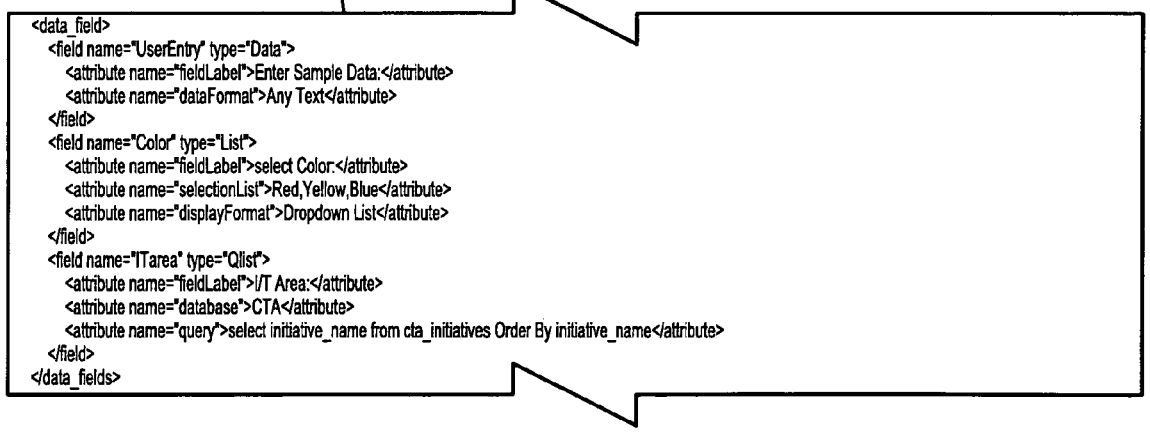
FIG. 5 illustrates storage of a portion of configuration information in a markup language according to one embodiment of the present invention.

An example of storing a portion (72) of configuration information (70) in a markup language as required by step 2*c* is shown as FIG. 5. The configuration information is stored as a workflow definition. In this example, the portion (72) of configuration information (70) was generated using the configuration panel (50) illustrated in FIG. 4.

Figure 6:
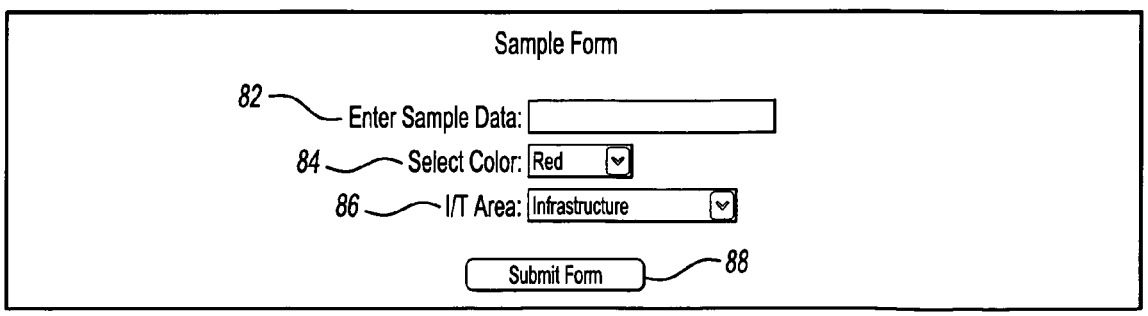
FIG. 6 is an example user interface version according to one embodiment of the present invention.

A user interface version (80) of the at least one form created in step 2 is shown as FIG. 6. Generating the user interface version (80) of the at least one form created in step 2 includes: creating a style sheet associated with the at least one form, wherein the style sheet defines rules for translating the markup language into the user interface version (80). The style sheet is created in a presentation language that defines rules for turning the markup language into the user interface version. In this example, the presentation language is Extensible Stylesheet Language and the system creates the style sheet, however, the developer can modify the style sheet created by the system to further customize the at least one form.

The system displays the user interface version (80) generated in step 3 in the base language of step 2 and includes the labels and fields specified by the developer in the configuration information. In the illustrated user interface version (80), entitled "Sample Form", the configuration information from FIG. 2 is used to generate a Data Entry "Enter Sample Data" (82), the configuration information from FIG. 3 is used to generate a Selection List (Itemized) "Select Color" (84), and the configuration information from FIG. 4 is used to generate a Selection List (Queried) "I/T Area" (86). Once a user enters sample data (82), selects a color (84) and selects an I/T Area (86), the user has the option to "Submit Form" (88).

FIG. 7 is an example of a translation input table (100). By identifying attributes (102) including attribute data and types of fields (104) as being translatable during the creation step 2, the developer can select to translate the at least one form into at least one alternate language different that the base language of step 2. Typically attributes such as Form Title, Field Labels, and Button Labels are all attributes that are designated as being translatable. When the developer selects to translate the at least one form, the attributes (102) and the types of fields (104) identified as being translatable are presented in the translation input table (100). The attributes (102) and the types of fields (104) are presented in the translation input table (100) in the base language (106) of step 2, in this example English, and input boxes (108) are provided for the developer to input an alternate language translation, which in this example is Spanish.

After inputting the alternate language translation, the developer then has the option to Save Translation (110) or Cancel Changes (112). When the option to Save Translation (110) is selected, the alternate translation is saved in an alternate language translation document in the markup language. While this example includes a translation from English to Spanish, the translation feature may be extended to other languages and to multiple languages with each alternate language being stored separately in the markup language. When one or more translations exist, the system generates the at least one form with a user selectable option to translate as illustrated in FIGS. 8A and 8B.

FIG. 8A is an example form (120) including a user selectable option to translate (122) displayed in the base language, English. The example form (120) includes a Form Title (124), Field Labels (126), and Button Labels (128) displayed in the base language. Selection Lists (130) are also displayed in the base language. The user selectable option to translate (122) includes a drop down list that includes available languages. In this example, a user has the option to select the language that the at least one form is displayed in from the list of available languages.

FIG. 8B is the example form (120) including the user selectable option to translate (122) displayed in a user selected alternate language, Spanish. In this example, the Form Title (124), the Field Labels (126), and the Button Labels (128) are displayed in the alternate language, Spanish. The Selection Lists (130) are also displayed in the alternate language.

In the example discussed above, the developer provides the at least one translation into at least one alternate language, different from the base language, for each individual attribute identified as being translatable during the creation of the at least one form. Alternatively, the developer can create the at least one form and provide at least one alternate translation into at least one alternate language, different than the base language, for the entire form subsequent to creation of the at least one form.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of generating a flexible automated workflow system comprising the steps of:
    identifying a workflow process;
    creating at least one form associated with the workflow process identified for display in a base language, wherein creating the at least one form includes:
        defining at least one field of information for the at least one form;
        generating configuration information for each field of information defined, including:
            determining a type of field associated with each field of information defined; and
            generating the configuration information based upon the type of field;
        storing the configuration information as a workflow definition in a markup language;
        identifying the attribute of information defined as being translatable from the base language into at least one alternate language, during creation of the at least one form, based upon the type of field determined to be associated with each field of information defined;
            providing at least one alternate translation for each field of information identified as being translatable, wherein the at least one alternate translation is provided in the at least one alternate language by a developer when the at least one form was created; and
            storing the at least one alternate translation for each field of information translated in at least one alternate language translation table;
    generating a user interface version of the at least one form based upon the workflow definition subsequent to the storing the at least one alternate translation step; and
    displaying the user interface version of the at least one form in the base language for use by a user.

2. The method of generating the flexible automated workflow system as recited in claim 1, wherein the markup language is Extensible Markup Language.

3. The method of generating the flexible automated workflow system as recited in claim 1, further including the steps of:
    providing a user selectable translation feature including the at least one alternate language;
    modifying the workflow definition based upon the at least one alternate language translation table when the user selects the at least one alternate language; and
    displaying the user interface version of the at least one form in the at least one alternate language based upon the modified workflow definition when the user selects the at least one alternate language.

4. The method of generating the flexible automated workflow system as recited in claim 1, further including the steps of:
    providing at least one alternate translation for each field of information identified as being translatable, wherein the at least one alternate translation is provided in the at least one alternate language by a developer subsequent to creation of the at least one form; and
    storing the at least one alternate translation for each field of information translated in at least one alternate language translation table.

5. The method of generating the flexible automated workflow system as recited in claim 4, further including the steps of:
    providing a user selectable translation feature including the at least one alternate language;
    modifying the workflow definition based upon the at least one alternate language translation table when the user selects the at least one alternate language; and
    displaying the user interface version of the at least one form in the at least one alternate language based upon the modified workflow definition when the user selects the at least one alternate language.

6. The method of generating the flexible automated workflow system as recited in claim 1, further including the step of:
    attaching at least one attribute to each field of information defined, wherein the at least one attribute is attached to each field of information via the markup language.

7. The method of generating the flexible automated workflow system as recited in claim 6, wherein the at least one attribute includes attribute data and further including the step of:
    identifying the attribute data of at least one attached attribute as being translatable from the base language into at least one alternate language.

8. The method of generating the flexible automated workflow system as recited in claim 7, further including the step of:
    providing at least one alternate translation for each attached attribute identified as being translatable, wherein the at least one alternate translation is provided in the at least one alternate language by a developer when the at least one form was created; and
    storing the at least one alternate translation for each field of information translated in at least one alternate language translation table.

9. The method of generating the flexible automated workflow system as recited in claim 8, further including the steps of:
    providing a user selectable translation feature including the at least one alternate language;
    modifying the workflow definition based upon the at least one alternate language translation table when the user selects the at least one alternate language; and
    displaying the user interface version of the at least one form in the at least one alternate language based upon the modified workflow definition when the user selects the at least one alternate language.

10. The method of generating the flexible automated workflow system as recited in claim 9, wherein the at least one attribute is one of: a field name and a field label.

11. The method of generating the flexible automated workflow system as recited in claim 6, further including the step of:
creating a style sheet associated with the at least one form, wherein the style sheet defines rules for translating the markup language into the user interface version.

12. The method of generating the flexible automated workflow system as recited in claim 11, wherein the style sheet is created in a presentation language.

13. The method of generating the flexible automated workflow system as recited in claim 12, wherein the presentation language is Extensible Stylesheet Language.

14. The method of generating the flexible automated workflow system as recited in claim 13, wherein the style sheet is created automatically by the flexible automated workflow system.

15. The method of generating the flexible automated workflow system as recited in claim 14, wherein the style sheet is customized by the developer.

16. A method of generating a flexible automated workflow system comprising the steps of:
identifying at least one workflow process;
creating a customized form for each workflow process identified including providing a translation feature; and
displaying the customized form in a base language for use by a user, wherein the translation feature includes translating the customized form from the base language to at least one alternate language different from the base language, wherein the customized form is created by a developer and the translation feature is user selectable by a user of the customized form.

17. The method of generating the flexible automated workflow system as recited in claim 16, further including the step of displaying the customized form in the at least one alternate language when the translation feature is selected by the user.

* * * * *